UNITED STATES PATENT OFFICE.

JOSEF HERTKORN, OF HATTERSHEIM, GERMANY.

PROCESS OF PRODUCING KETONES OF HIGH BOILING-POINTS FROM ACETONE AND HOMOLOGUES THEREOF.

1,030,177. Specification of Letters Patent. Patented June 18, 1912.

No Drawing. Application filed February 26, 1912. Serial No. 679,941.

*To all whom it may concern:*

Be it known that I, JOSEF HERTKORN, a subject of the German Emperor, and resident of Hattersheim, Germany, have invented certain new and useful Improvements in Processes of Producing Ketones of High Boiling-Points from Acetone and Homologues Thereof, of which the following is a specification.

In accordance with known processes for the production of condensed ketones of high boiling points from ketones of low boiling points, by means of condensing agents, mixtures containing products of decomposition have been frequently obtained. Strong acids and caustic alkalis have partly a substituting action and partly a decomposing one, or else, on heating, they produce a deep seated interamolecular change giving rise to aromatic hydrocarbons or there are produced in addition to a mixture of mesityl oxid, phorone isophorone and xylitol, ketone alcohols that are easily decomposed, or the alcoholates thereof and other products which are difficultly or uneconomically separated from one another. Thus acetone when mixed in accordance with known processes with excess of caustic lime, or burnt lime, or caustic alkalis, and on being left for some length of time with these substances produces a semi-solid to solid mass, the acetone disappearing while the subsequent distillation, after several days, over condensing agents with or without the addition of water yields a mixture of phorone or isophorone, mesityl oxid, xylitol, ketone alcohols and the like, in addition to large amounts of dark colored products of decomposition. The yield of phorone or isophorone and mesityl oxid amounts under most favorable conditions to about 50 per cent. of the acetone employed; further these products are not fast to light and air, but on the contrary quickly discolor from yellow to brown.

According to the investigations of the applicant, oxids and hydroxids of the earth alkalis and alkalis in conjunction with water at ordinary, or moderately high, temperatures, or the oxids with exclusion of water and with heat, on being kept in contact for some time with the acetone, have not only a condensing action on the acetone and the primary products arising therefrom, such as a mixture of phorone or isophorone, mesityl oxid, xylitol, and like substances of higher boiling points, but they have also the property of fixing water with the formation of ketone alcohols, or alcoholates, and the further products of decomposition as a consequence of the action of the alkali hydroxid. The mixture of substances first formed at ordinary temperature undergoes under the prolonged action and in the distillation over water containing condensation agents a further mutual decomposition and a thorough change and decomposition according to the manner and the amount of water present and the duration of heating.

The invention therefore comprises the method of using the oxids of the earth alkalis, such for instance as calcium, barium, strontium and magnesium oxids in molecular proportion or in slight excess with complete exclusion of water and alcohol for the purpose of forming mesityl oxid or the higher product of condensation of the formula $C_9H_{14}O$ by the chemical binding of water in amounts corresponding to both substances with the anhydrous oxids in the cold or at ordinary or moderately high temperature and especially in a definitely limited time with the exclusion of heat and distillation. The applicant has thus found a method capable of being readily carried out for producing these substances separately in a practically pure state without any by-products and products of decomposition on a large scale and in a cheap and economical manner.

The reaction in the absence of water and alcohol in the cold or at ordinary or moderate temperatures takes place in accordance with the following equations:—

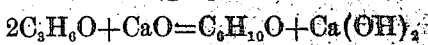

In order to get rid of the further action of the earth alkali hydroxids on the condensation products formed at first, the colorless clear liquor free from bases must be decanted at once from the precipitate and the residue lixiviated in the cold with hydrocarbons or extracted, and the extracting agent removed with the last remains of the condensed products by distillation *in vacuo*.

The time occupied for the conversion of acetone into mesityl oxid by means of granulated burnt lime at the ordinary temperature, i. e. between 10° and 18° centigrade is about from 3 to 5 days according to the granulation of the lime and the motion of the mixture. To obtain a uniform reaction a constant mingling of the constituents is required. Similar condensation products are obtained in accordance with the present process from the homologues of acetone, such as methyl-ethyl-ketone, di-ethyl-ketone, methyl-propyl-ketone and the like. The neutral substances obtained are used as solvents for resins and cellulose esters in lieu of the unstable alkyl esters, such for instance as amyl acetate, which split off acid and are injurious in their action.

Example: 1000 kilograms of anhydrous acetone or a homologue thereof and from 550 to 650 kilograms of freshly burnt and granulated lime containing about 80 per cent. calcium oxid or the equivalent amount of barium, stontium, or magnesium oxid, are introduced into a tightly closed container provided with stirring devices or into a rotated vessel. The stirring device or the rotated vessel is allowed to run for from 3 to 5 days at the ordinary or at moderately high temperature. The progress of the reaction is controlled by taking samples which are subjected to fractional distillation. If the liquor shows the constant boiling point of from 120° to 132° centigrade and if on pouring off a sample on paper it continues free from odor after a few minutes in the air the mixing is at once stopped and the liquor is allowed to stand a short time and settle. The perfectly colorless and clear mesityl oxid is drawn off at once from the bottom sediment and can be used directly as a solvent for resins and cellulose esters, or it is first subjected to distillation. The rest of the mesityl oxid is removed from the lime residue by lixiviation, or extraction with hydrocarbons such as bensin, benzol and the like which can be used at the same time as a diluting and dissolving agent; the last traces together with the solvent are removed by distillation *in vacuo*, or the reaction product is distilled off quickly *in vacuo* over the metal oxid. The condensation is accelerated by slightly heating, a slight excess of calcium oxid or by pressure or an intimate mixing and fine granulation of the burnt lime. Or the acetone is passed through a tower or battery of calcium oxid at a definite velocity of flow. The formation of higher products of condensation requires however in comparison with the formation of mesityl oxid a considerably longer time and a larger excess of burnt lime. In other respects the reaction takes place under similar conditions. The yield of mesityl oxid is practically the theoretical yield and the product is very pure. It is an excellent solvent for all kinds of resins and cellulose esters; it possesses an agreeable though slight odor, is colorless and is unchanged by light and air and quite innocuous.

What I claim is:

1. The process of producing ketones of high boiling points from ketones of the homologous series of which acetone is the lowest member which comprises treating such ketones with the oxid of an alkaline earth metal and maintaining the reaction liquid in constant circulation throughout the process, and in separating the resulting condensation products from the reaction mass before, and at a temperature below that at which, the formation of the objectionable impurities and by-products takes place.

2. The process of producing mesityl oxid from acetone which comprises treating acetone with the oxid of an alkaline earth metal in the proportion of about one molecule of such oxid to two molecules of acetone and maintaining the reaction liquid in constant circulation throughout the process, and in separating the resulting mesityl oxid from the reaction mass before, and at a temperature below that at which, the formation of objectionable impurities and by-products takes place.

3. The process of producing mesityl oxid from acetone which comprises treating acetone with calcium oxid in the proportion of about one molecule of such oxid to two molecules of acetone and maintaining the reaction liquid in constant circulation throughout the process, and in separating the resulting mesityl oxid from the reaction mass before, and at a temperature below that at which, the formation of objectionable impurities and by-products takes place.

In testimony whereof I have signed my name to this specification in the presence of two subscribing witnesses.

JOSEF HERTKORN.

Witnesses:
 FRANZ HASSLACHER,
 MICHEL VOLK.